C. G. TUCKER.
CAKE MACHINE.
APPLICATION FILED JAN. 17, 1908.

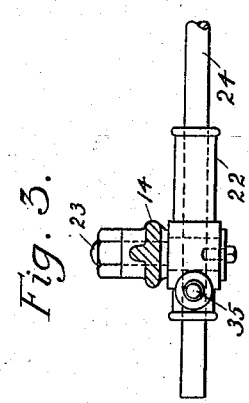

911,851.

Patented Feb. 9, 1909.
2 SHEETS—SHEET 2.

Witnesses
Fritz Haempfli.
Otto L. Koch.

Clare G. Tucker, Inventor
By D. K. Allison
his atty.

UNITED STATES PATENT OFFICE.

CLARE G. TUCKER, OF CINCINNATI, OHIO, ASSIGNOR TO THE J. H. DAY COMPANY, OF CINCINNATI, OHIO, A CORPORATION OF OHIO.

CAKE-MACHINE.

No. 911,851.     Specification of Letters Patent.     Patented Feb. 9, 1909.

Application filed January 17, 1908. Serial No. 411,313.

*To all whom it may concern:*

Be it known that I, CLARE G. TUCKER, a citizen of the United States, residing at Cincinnati, in the county of Hamilton and State of Ohio, have invented certain new and useful Improvements in Cake-Machines, of which the following is a specification.

My invention relates to that class of machines in which the cake material is placed in a hopper and fed by rolls through a die plate by which it is separated into formed masses, cut off, and dropped into pans ready for baking, and has for its object, first, to provide a simple and efficient means for tipping the hopper over so that the rolls and die plate attached thereto may be cleaned readily; second, to provide means for adjusting the cutting off device to suit the requirements of various sized cakes; third, to provide means whereby the cutting off device may be quickly disconnected from its actuating mechanism for the purpose of effecting the aforesaid adjustment.

I attain the above mentioned objects by the mechanism illustrated in the accompanying drawings in which—

Figure 5:
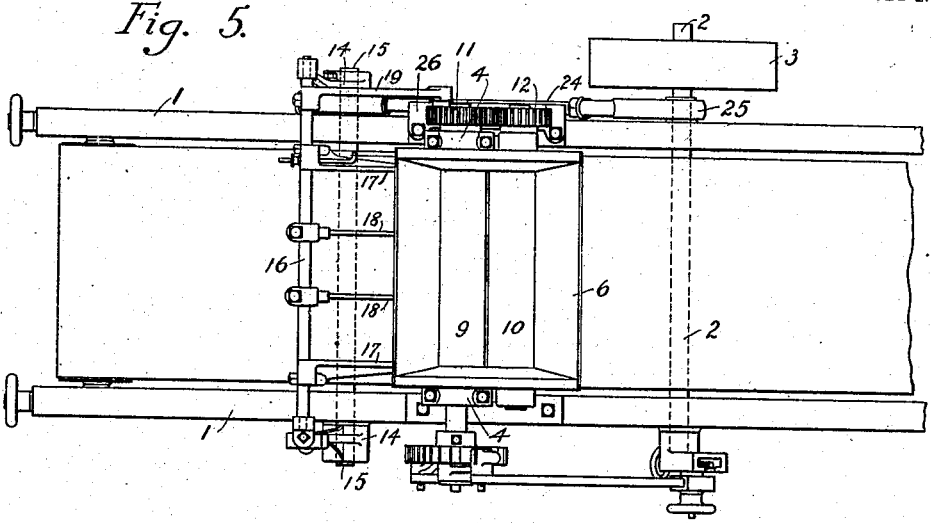
Figure 6:
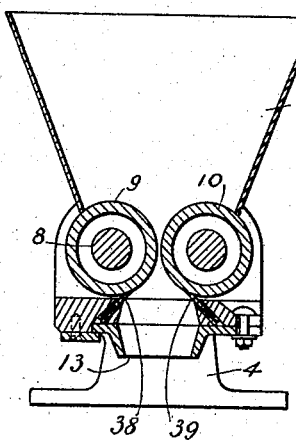
Figure 7:
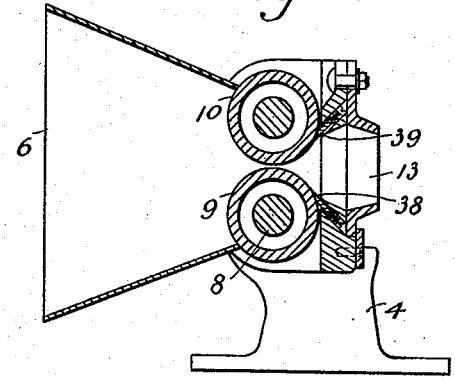
Figure 8:
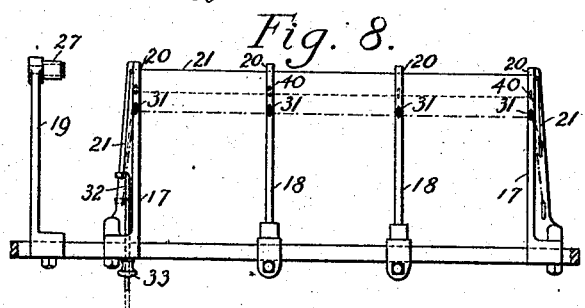
Figure 9:
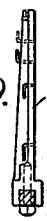

Figure 1 is a side elevation of the machine. Fig. 2 is a detail vertical section through sleeve 22, showing the means used for disconnecting the cutting off device from its actuating mechanism. Fig. 3 is a plan view of the parts shown in Fig. 2. Fig. 4 is a partial transverse section through the hopper 6, showing the means used for tipping same. Fig. 5 is a plan view of the machine. Fig. 6 is a vertical longitudinal section through the hopper. Fig. 7 is a similar view of hopper showing the position when tipped over. Fig. 8 is a detail plan view of the cutting off frame showing how the cutting off wire is attached. Fig. 9 is an edge view of the parts shown in Fig. 8. Fig. 10 is a detail vertical section through the die plate, a side elevation of the cutting off frame and the shuttle operating same. Fig. 11 is similar to Fig. 10, with the die plate omitted, showing the movement of the cutting off frame.

I have shown my invention mounted upon a suitable frame comprising a pair of side frames 1—1 secured together in any suitable manner. Extending transversely of said side frames, and journaled thereupon, is the shaft 2, driven by the pulley 3. Mounted upon each of said side frames is the bracket 4 provided with the bearing 5.

The hopper 6 is provided with a trunnion 7 on each end, rotatably mounted in said bearings 5—5. Through the center of said trunnion, and concentric therewith, the shaft 8 revolves, carrying the feed roll 9, and driving the companion roll 10 by the gears 11 and 12. Secured to the bottom of said hopper 6 and central therewith and beneath the rolls 9 and 10, is the die plate 13. The arms 14—14 pivoted on the shaft 15 carry the rod 16 upon which fingers 17—17, 18—18 and 19 are mounted. The fingers 17 and 18 are provided with serrations 20 cut in their extremities which serve to hold a fine wire 21.

I have elected to style the assemblage of parts 16, 17, 18, 19, 20 and 21, and their essential concomitants, the cutting-off device. The sleeve 22 is pivotally mounted on arm 14 by the stud 23 and has slidably connected therewith the eccentric rod 24 secured to the eccentric 25, mounted on shaft 2. I have chosen to designate the parts 24 and 25 as the actuating mechanism for the cutting off device. The sleeve 22 is provided with a plunger 34, having the knob 35 and compression spring 36 which holds said plunger in the hole 37 in said eccentric rod.

When the machine is operating the cake material is fed by the rolls 9 and 10 through the die plate 13, and when the proper amount of the material has been forced through said die plate the arm 14 actuated by the eccentric rod 24 and eccentric 25 carries the cutting off device forward with its cutting off wire 21 in close proximity with said die plate and beneath same and in such operation the wire 21 cuts off the extending cake material and the same drops upon pans beneath. The extent of the movement of the cutting-off device is fixed and predetermined by the amount of eccentricity of the eccentric 25 and the arm 14 and connecting parts, and is sufficient to enable the cutting-off wire to travel the full width of the widest die plate. Such die plate 13 is shown in section in Fig. 10. When die plates having wide openings are used, the cutting-off wire is placed on the end of the frame as shown in Fig. 8. When the cutting-off frame has completed its forward travel it is dropped and returns to its starting point in a lower plane, the forward and rearward movement of said frame being illustrated in Figs. 10 and 11 respectively. This movement of the cutting-off frame is accomplished by the arm 19 provided with the roller 27 coöperating with a shuttle device, comprising the casting 26 having the channel 28 in which the roller 27 travels in its return stroke and the angle plate 29 pivoted at 30, over which angle plate said roller travels in its forward movement. This shuttle device is old and well known.

It is desirable to have the forms of cake material drop as soon as they are cut off by the wire and such immediate dropping is facilitated by having the wire drop as soon as the cutting-off process is completed. I have discovered, by experiment, that in case the cutting-off wire does not drop as soon as the cake material is cut off, that the formed material will cling to the wire and become disfigured thereby; but by having the wire drop suddenly as soon as the formed material is cut off, the downward motion of the wire greatly facilitates the dropping of the formed material and the same is deposited upon pans below in a perfect condition. Now since this machine is designed for various sized cakes, including very large and very small ones, die plates with very wide and very narrow openings will be used. I have shown, in Fig. 10, a die plate with a very large opening and also, by dotted lines, one with a very small opening. When dies with large openings are used the cutting-off wire is placed at the extremities of the fingers 17 and 18, as shown in Fig. 8, but when dies with small openings are used the cutting-off wire is placed around the hooks 31 in the position shown in dot and dash line in Fig. 8. By thus changing the position of the cutting-off wire to that shown by dot and dash line in Fig. 8 when very small cakes are desired, the dropping movement of the wire will occur at or about the moment the cutting-off process is completed and thus produce the result desired and by placing the wire in the position shown by the full line in Fig. 8 it will drop at or about the proper moment when used to cut off large cakes.

In case it is desirable to form cakes the length of which are intermediate between the aforesaid two extremes other hooks similar to 31 may be inserted at any point on the fingers 17 and 18 between that shown in Fig. 8 and the extremities thereof, as at 40, and by so doing the wire may be given any position between the two extremes shown, to-wit, that shown by dotted line.

I have provided the hook 32 with the nut 33 for tightening the cutting-off wire whether it is placed at the finger extremities or under the hooks 31—31. When it is necessary to adjust the cutting-off wire, to change same from one position to the other, or to repair the wire, access to the same is greatly facilitated by raising the plunger 34 out of the hole 37 by taking hold of the knob 35 and thus disconnecting the cutting-off device from its actuating mechanism and throwing back the arm 14 and thus withdrawing the cutting-off frame from beneath the hopper. The rolls 9 and 10 are provided with scrapers 38 and 39 which serve to prevent the cake material from adhering to same.

Having fully described my invention, what I claim as new and desire to secure by Letters Patent is:

1. In a cake machine the combination with feed rolls of a receiving hopper mounted upon the axis of one of said feed rolls and arranged to be tipped over upon said axis.

2. In a cake machine the combination with feed rolls of a receiving hopper contiguous thereto and mounted upon the axis of one of said feed rolls and arranged to be tipped over upon said axis.

3. In a cake machine the combination with feed rolls of a receiving hopper mounted upon the axis of one of said rolls and scrapers for said feed rolls, said hopper and scrapers being arranged to be tipped over upon the said axis.

4. In a cake machine the combination with feed rolls of a receiving hopper mounted upon the axis of one of said rolls, scrapers for said rolls and a die plate beneath the same, said hopper, scrapers and die plate being arranged to be tipped over upon the said axis.

5. In a cake machine the combination with a receiving hopper provided with feed rolls of supporting trunnions concentric with one of said feed rolls.

6. In a cake machine the combination with a receiving hopper provided with feed rolls and scrapers for said rolls of supporting trunnions concentric with one of said feed rolls.

7. In a cake machine the combination with a receiving hopper provided with feed rolls and scrapers for said rolls and a die plate beneath the same of supporting trunnions concentric with one of said feed rolls.

8. In a cake machine the combination with a receiving hopper supported upon trunnions, and feed rolls, of a driving shaft for one of said feed rolls, said shaft being concentric with said trunnions.

9. In a cake machine the combination with a receiving hopper supported upon trunnions and feed rolls having scrapers, of a driving shaft for one of said feed rolls, said shaft being concentric with said trunnions.

10. In a cake machine the combination with a receiving hopper supported upon trunnions, feed rolls having scrapers and a die plate, of a driving shaft for one of said feed rolls, said shaft being concentric with said trunnions.

11. In a cake machine the combination with holding, feeding and forming means for cake material of a cutting-off device comprising a frame, actuating means for said frame, and a wire stretched across said frame adjustable to different courses of travel arranged to terminate at different positions with respect to said forming means.

12. In a cake machine the combination with holding, feeding and forming means and a cutting-off device of actuating mechanism normally connected to said cutting-off device and manually operative means for disconnecting such cutting-off device from its actuating mechanism, comprising a sleeve, a plunger mounted therein, and a hole in said actuating mechanism for receiving said plunger.

CLARE G. TUCKER.

Witnesses:
FRITZ HAEMPFLI,
OTTO L. KOCH.